United States Patent [19]

Harreus et al.

[11] 4,009,135
[45] Feb. 22, 1977

[54] ADDITIVE FOR MORTAR AND CONCRETE

[75] Inventors: Albrecht Harreus, Kelkheim, Taunus; Eberhard Müller, Frankfurt am Main; Gerhart Schultz, Darmstadt, all of Germany

[73] Assignee: Hoechst Aktiengesellschaft, Frankfurt am Main, Germany

[22] Filed: Oct. 4, 1974

[21] Appl. No.: 512,097

[30] Foreign Application Priority Data

Oct. 4, 1973 Germany ................... 2349910

[52] U.S. Cl. .................... 260/29.4 UA; 260/39 R
[51] Int. Cl.$^2$ ........................... C08L 61/20
[58] Field of Search ............. 260/29.4 UA, 29.4 R, 260/67.8, 42.13, 856, 39 R

[56] References Cited

UNITED STATES PATENTS

| | | | |
|---|---|---|---|
| 2,393,755 | 1/1946 | D'Alelio | 260/67.8 |
| 3,121,702 | 2/1964 | Sherr et al. | 260/42.13 |
| 3,240,736 | 3/1966 | Beckwith | 260/29.2 R |

FOREIGN PATENTS OR APPLICATIONS

| | | |
|---|---|---|
| 1,471,153 | 3/1969 | Germany |
| 1,671,017 | 10/1973 | Germany |
| 1,909,681 | 9/1970 | Germany |
| 2,102,456 | 7/1972 | Germany |
| 2,049,144 | 8/1973 | Germany |

*Primary Examiner*—J. Ziegler
*Attorney, Agent, or Firm*—Curtis, Morris & Safford

[57] ABSTRACT

The properties of mortar and concrete are improved by the addition to the fresh mortar or concrete of an aqueous dispersion of a plastic obtained by the emulsion polymerization of olefinically unsaturated monomers, and of a polycondensate of formaldehyde and an amino-s-triazine modified with sulfite or sulfonic acid. A well-balanced relation between the compressive strength, the tensile strength in bending, and the adhesion to aged and hardened mortar or concrete is thus obtained.

3 Claims, No Drawings

ADDITIVE FOR MORTAR AND CONCRETE

The present invention relates to an additive, in the form of an aqueous dispersion of a plastic, for mortar and concrete and to a method of using the additive to improve the properties of mortar and concrete containing plastics.

It is already known that dispersions of a plastic can be used.

It is already known that plastics dispersions can be used as an additive for mortar and concrete. The addition of such dispersions, of a plastic for example, based on styrene and acrylonirile, is described in German Offenlegungschrift No. 1,471,153, published Mar. 29, 1969. Furthermore it is known from German Offenlegungsschriften Nos. 1,671,017, published Sept. 2,1971, and 1,909,681, published 17, 1970, that watersoluble polycondensates, for example sulfite and sulfonic acid modified resins based on an amino-s-triazine having at least two $NH_2$ groups, may be used in the form of aqueous solutions or water-free pulverized resins, as additives for mortar and concrete. The combined addition of polymers of olefinically unsaturated compounds and polycondensates of modified amino-s-triazines to the concrete or mortar mixtures is also described. In this process the polymer is incorporated into the mortar mixture in the form of a dispersible powder together with the solid or dissolved polycondensate and optionally further additives, according to German Auslegeschrift No. 2,102,456, granted or a mixture of an aqueous dispersion of a plastic and an aqueous polycondensate solution is spray dried and added to the mortar in the form of a dried powder, according to German Auslegeschrift No. 2,049,114, published Apr. 13, 1972.

The use of polymers in the form of a spray dried dispersible powder has, however, a series of inconveniences. The drying process irreversibly modifies the properties of the polymer particles. A powder dispersible in water contains substantially coarser polymer particles than the starting dispersion wherefrom it has been prepared and has therefore a greater tendency to sedimentation. The viscosity of the starting and final dispersion having the same polymer content are, moreover, variable in each case. Because the sensitive emulsifier-protective colloid system is unfavorably affected by the drying process, the final dispersions prepared from dispersible powders are altogether less stable than the starting dispersions obtained by emulsion polymerization.

It has now been found that the properties of a concrete or mortar containing polycondensate can be further improved by adding an aqueous dispersion of a plastic obtainded by emulsion polymerization to the mixture of an inorganic binding agent and additives comprising polycondensates. If the dispersion of the plastic is added in its original form, the polymer particles are incorporated into the concrete or mortar mixture in a finely divided form, thus affecting the strength properties far more favorably than the same dispersion in the form of a spray dried dispersible powder having essentially coarser particles. Furthermore, not all dispersions of plastics can be spray dried in a satisfactory manner so that the choice and combination possibilities are substantially greater if aqueous dispersions of plastics are used.

Suitable dispersions of plastics are the known polymer and copolymer dispersions of olefinically unsaturated monomers prepared by emulsion polymerization, or example, vinyl esters of saturated monocarboxylic acids, such as vinyl acetate, vinyl propionate, vinyl isobutyrate, vinyl laurate, vinyl versatate, acrylic or methacrylic acid esters, such as ethyl acrylate or methyl methacrylate, vinyl or vinylidene halides, such as vinyl chloride or vinylidene chloride, unsaturated hydrocarbons, such as ethylene, styrene, vinyl toluene or butadiene or acrylonitrile. Difficulty saponificable or unsaponificable plastics dispersions, e.g., those having a plastics proportion relatively resistant to the action of alkalies, are especially preferred. Examples of such plastics dispersions are copolymer dispersions of vinyl acetate/vinyl chloride, vinyl propionate/vinyl chloride, vinyl acetate/ethylene, vinyl acetate/vinyl chloride/ethylene, vinyl acetate/vinyl chloride/vinyl laurate, vinyl acetate/vinyl versatate, styrene/butyl acrylate, styrene/butadiene, styrene/acrylonitrile, butyl acrylate/methyl methacrylate and butyl acrylate/vinylidene chloride.

The following properties of the known concrete or mortar mixtures already containing a plastic addition in the form of a polycondensate of modified amino-s-triazines are further improved by the addition of an aqueous dispersion of a plastic the water retaining power of the freshly mixed mortar, the woring properties (and the possiblility of reducing the water/binding agent coefficient), the cohesiveness of the mortar in the individual steps of the working process, a pumping, roughcasting or finishing, the adhesion of the freshly mixed or hardened mortar to the base, the elasticity, and better tensile strength in bending. Tensions occurring in the age hardening process decrease, whereby the susceptibility to cracking is reduced. The waterproofness is increased.

If the polymer is used in the form of the spray dried dispersible powder, this improvement is not obtained to the same degree as if the polymer is in the form of an aqueous dispersion obtained by emulsion polymerization.

The aqueous dispersion of a plastic can be added to the motar mixture as such or together with the batch water. A mixture of the aqueous dispersion of a plastic and the aqueous polycondensate solution is however preferably used. In order to assure the compatibility of both systems, the pH or the dispersion must be adjusted to a value greater than 7, preferably from 8 to 9, by adding alkalies. In this way the mixture remains stable and storable over a sufficient long period of time.

The aqueous dispersion of a plastic is added to the buiding material mixtures in an amount of from 2 to 30% by weight, preferably 10 to 20% by weight, calculated on the inorganic binding agent. If a mixture of an aqueous dispersion of a plastic and an aqueous polycondensate solution is used, the weight ratio of the aforesaid components is in the range of from 50 : 50 to 90 : 10. In this case, the aqueous dispersion of a plastic has a solids content of about 50% by weight, while that of the aqueous polycondensate solution is about 25% by weight.

The following examples illustrate the invention.

EXAMPLE 1

0.20 Part by weight of an alkaline mixture of 80 parts by weight of a 50% aqueous dispersion of a plastic of vinyl acetate, vinyl chloride and ethylene in a monomer proportion of 60:30:10 and 20 parts by weight of a 25% aqueous solution of a polycondensate of melamine, formaldehyde and sulfonate, in a molar proportion of 1:6:3 were added to a test mortar of 1 part by weight of Portland cement PZ 350 F
1 part by weight of standard sand I
2 parts by weight of standard sand II
and water.

The water content of the mortar was adjusted such that the slump (measure for the plasticity of the mortar) was in the range of from 13 to 18 cm, whereby the water contained in the plastics mixture was added to the batch water. A strength test according to DIN 1164 was carried out with the mortar by means of prisms of 4 × 4 × 16 cm.

The test data of the compressive strength are average data of 6 individual measurements; the data of the tensile strength in bending are average data of 3 individual measurements. In the case of the dry storage, the test specimens were taken from the mould 24 hours after having been prepared, stored in water for 24 hours, and then stored at room temperature in a dry state until the strength values were determined. In the case of the wet storage, the test specimens were stored in water until the test date, after having removed the mould.

In order to determine the adhesive strength, the test mortar was applied to a ring on a unpretreated concrete base and age hardened at room temperature in the air. A plate which may be torn off was cemented to the test specimen prior to the test by means of a reactive resin and the adhesive strength was determined by means of the tensile strength apparatus. The test data are average data of 3 individual measurements each time.

The results are shown in the following Table 1.

EXAMPLE 2

Test mortar was prepared as in Example 1, whereby a 50% by weight aqueous dispersion of a plastic of butyl acrylate and methyl methacrylate in a monomer ratio of 50:50 was used instead of the dispersion of a plastic of vinyl acetate, vinyl chloride and etylene.

EXAMPLE 3

Test mortar was prepared as in Example 1, but with the addition of 0.05 part by weight of an alkaline mixture of 70 parts by weight of a 50% aqueous dispersion of a plastic of butyl acrylate and methyl methacrylate in a monomer ratio of 50:50 and 30 parts by weight of a 25% aqueous solution of a polycondensate of melamine, formaldehyde and sulfonate in a molar ratio of 1:2:1.

EXAMPLE 4

Test mortar was prepared as in Example 1, but with the addition of 0.10 part by weight of an alkaline mixture of 70 parts by weight of a 50% aqueous dispersion of a plastic of butyl acrylate and methyl methacrylate in a monomer ratio of 50:50 and 30 parts by weight of a 25% aqueous solution of a polycondensate of melamine, formaldehyde and sulfonate, in a molar ratio of 1:2:1.

EXAMPLE 5

Test mortar was prepared as in Example 1, but with the addition of 0.30 part by weight of an alkaline mixture of 90 parts by weight of a 50% aqueous dispersion of a plastic of butyl acrylate and methyl methacrylate in a monomer ratio of 50:50 and 10 parts by weight of a 25% aqueous solution of a polycondensate of melamine, formaldehyde and sulfonate in a molar ratio of 1:2:1.

COMPARATIVE EXAMPLES

The comparative examples were carried out as in Example 1, but with the following additives:

COMPARATIVE EXAMPLE 1 was carried out with the addition of 0.08% by weight of a 25% aqueous solution of a polycondensate of melamine, formaldehyde and sulfonate in a molar ratio of 1:6:3.

COMPARATIVE EXAMPLE 2 was carried out with the addition of 20% by weight calculated on the cement of an aqueous dispersion of a plastic of methyl methacrylate and butyl acrylate in a monomer ratio of 50:50 having a solids content of about 50%.

COMPARATIVE EXAMPLE 3 was carried out with the addition of 10% by weight, calculated on the cement, of a commercial additive of a dispersible powder and a polycondensate according to the instructions of the producer.

The test data indicated in the Table are relative values, calculated on the blank mixture (mortar without any of plastics for the sake of clarity. The tensile strength in bending and the compressive strength of the blank mixture were fixed at 100.

It can be seen from the comparative examples that a considerable improvement in the adhesive strength results from the addition of the dispersion alone, on the one hand, but that, on the other hand, a high decrease in the compressive strength takes place, especially in the case of the wet storage.

An addition of the sulfonated melamine/formaldehyde condensate along (Comparative Example 1) leads to a well-balanced relation of the tensile strength in bending and the compressive strength. The adhesive strength is scarcely affected, however.

The use of the dispersible powder (Comparative Example 3) results in a favorable tensile strength in bending and compressive strength proportion in the case of a dry storage, but considerably reduces both values in the case of a wet storage. The adhesive strength is scarcely improved.

By using the aqueous dispersion of a plastic according to the invention together with an aqueous solution of the sulfonated melamine formaldehyde condensate, the latter solution being possibly contained in the freshly mixed mortar, a balanced ratio of tensile strength in bending and compressive strength, as well as an improved adhesive strength, is obtained, which latter may even reach the characteristic tensile strength of the mortar.

TABLE

| Example | Slump (cm) | Water/ cement coefficient | Dry storage | | | |
|---|---|---|---|---|---|---|
| | | | Tensile strength in Bending after 7 days | after 28 days | Compressive strength after 7 days | after 28 days |
| Blank mixture | 14.6/14.5 | 0.50 | 100 | 100 | 100 | 100 |
| 1 | 14.4/14.6 | 0.41 | 128 | 114 | 92 | 92 |
| 2 | 17.5/18.0 | 0.40 | 151 | 159 | 104 | 116 |
| 3 | 15.4/15.6 | 0.48 | 115 | 110 | 92 | 94 |
| 4 | 14.5/14.6 | 0.46 | 129 | 123 | 103 | 107 |
| 5 | 15.8/15.9 | 0.42 | 150 | 140 | 105 | 120 |
| Comparative Example 1 | 15.5/15.8 | 0.46 | 115 | 111 | 106 | 106 |
| comparative example 2 | 14.3/14.5 | 0.42 | 139 | 122 | 83 | 80 |
| comparative Example 3 | 14.0/14.5 | 0.44 | 111 | 107 | 87 | 97 |

TABLE

| Example | Wet storage | | | | |
|---|---|---|---|---|---|
| | Tensile strength in Bending after 7 days | after 28 days | Compressive strength after 7 days | after 28 days | Adhesiveness (kp/cm$^2$) after 28 days |
| Blank mixture | 100 | 100 | 100 | 100 | 1 – 2 |
| 1 | 104 | 91 | 91 | 82 | 10.0 |
| 2 | 110 | 102 | 93 | 100 | 23.5 |
| 3 | 100 | 98 | 90 | 104 | 8.7 |
| 4 | 101 | 100 | 92 | 97 | 19.0 |
| 5 | 103 | 106 | 88 | 98 | 25.0 |
| Comparative Example 1 | 113 | 92 | 104 | 98 | 2.0 |
| comparative example 2 | 99 | 100 | 100 | 78 | 22.1 |
| comparative Example 3 | 90 | 80 | 83 | 76 | 4.6 |

What is claimed is:

1. In a process for making mortar or concrete by admixing, with said mortar or concrete, (a) a polycondensate of formaldehyde and an amino-s-triazine modified with sulfite or sulfonic acid and (b) a polymer of at least one olefinically-unsaturated monomer, the improvement wherein said polymer is admixed, with said mortar or concrete, as an aqueous dispersion prepared by the aqueous emulsion polymerization of said monomer or monomers.

2. An additive for mortar or concrete, said additive containing (a) from 10 to 50 percent by weight of an aqueous solution of a polycondensate of formaldehyde and an amino-s-triazine modified with sulfite or sulfonic acid, said solution having a solids content of about 25 percent by weight, and (b) from 90 to 50 percent by weight of an aqueous dispersion of a polymer of at least one olefinically-unsaturated monomer, said dispersion having a pH value greater than 7, a solids content of about 50 percent by weight, and being prepared by an aqueous emulsion polymerization of said monomer or monomers.

3. An additive as in claim 2 wherein said polymer is a copolymer of butyl acrylate and methyl methacrylate in a monomer ratio of 50:50.

* * * * *